United States Patent
Lee et al.

(10) Patent No.: US 9,372,790 B2
(45) Date of Patent: Jun. 21, 2016

(54) NONVOLATILE MEMORY DEVICE HAVING WEAR-LEVELING CONTROL AND METHOD OF OPERATING THE SAME

(71) Applicants: Wonseok Lee, Suwon-Si (KR); Youngkug Moon, Suwon-Si (KR); Taek-Sung Kim, Yongin-Si (KR)

(72) Inventors: Wonseok Lee, Suwon-Si (KR); Youngkug Moon, Suwon-Si (KR); Taek-Sung Kim, Yongin-Si (KR)

(73) Assignee: SAMSUNG ELECTRONICS CO., LTD., Suwon-Si, Gyeonggi-do (KR)

( * ) Notice: Subject to any disclaimer, the term of this patent is extended or adjusted under 35 U.S.C. 154(b) by 168 days.

(21) Appl. No.: 13/954,135

(22) Filed: Jul. 30, 2013

(65) Prior Publication Data
US 2014/0040535 A1 Feb. 6, 2014

(30) Foreign Application Priority Data
Jul. 31, 2012 (KR) ........................ 10-2012-0084078

(51) Int. Cl.
*G06F 12/02* (2006.01)

(52) U.S. Cl.
CPC .... *G06F 12/0246* (2013.01); *G06F 2212/7211* (2013.01)

(58) Field of Classification Search
CPC ............ G06F 12/0246; G06F 2212/72; G06F 12/7211; G06F 2212/7201
See application file for complete search history.

(56) References Cited

U.S. PATENT DOCUMENTS

| | | | | |
|---|---|---|---|---|
| 3,492,470 | A | * | 1/1970 | Gorbatenko ................... 708/813 |
| 5,020,028 | A | * | 5/1991 | Wanlass ........................ 365/154 |
| 5,544,356 | A | * | 8/1996 | Robinson .............. G06F 3/0601 365/185.11 |
| 5,737,742 | A | * | 4/1998 | Achiwa et al. ................ 711/103 |
| 8,045,363 | B2 | | 10/2011 | Kim |
| 2005/0188147 | A1 | * | 8/2005 | Tanaka ........................ 711/103 |
| 2005/0281088 | A1 | * | 12/2005 | Ishidoshiro et al. ..... 365/185.29 |
| 2007/0204128 | A1 | * | 8/2007 | Lee et al. ...................... 711/173 |
| 2007/0233941 | A1 | | 10/2007 | Lee et al. |
| 2008/0005452 | A1 | | 1/2008 | Suda |
| 2008/0140918 | A1 | | 6/2008 | Sutardja |
| 2009/0052236 | A1 | * | 2/2009 | Bae et al. ...................... 365/163 |

(Continued)

FOREIGN PATENT DOCUMENTS

| | | |
|---|---|---|
| JP | 2007-328620 A | 12/2007 |
| JP | 2009-110314 A | 5/2009 |

(Continued)

OTHER PUBLICATIONS

Lei Jiang et al., "LLS: Cooperative Integration of Wear-Leveling and Salvaging for PCM Main Memory".

*Primary Examiner* — Michael Krofcheck
(74) *Attorney, Agent, or Firm* — Volentine & Whitt, PLLC

(57) ABSTRACT

A method is provided for controlling a write operation in a nonvolatile memory device to provide wear leveling, where the nonvolatile memory device includes multiple memory blocks. The method includes reading write indication information with respect to at least a selected memory block of the multiple memory blocks; determining whether a write order of data to be stored in the selected memory block is an ascending order or a descending order, based on the write indication information of the selected memory block; and generating addresses of memory regions in the selected memory block in an ascending order when the write order of the data is determined to be an ascending order, and generating addresses of the memory regions in the selected memory block in a descending order when the write order is determined to be a descending order.

22 Claims, 17 Drawing Sheets

(56) References Cited

U.S. PATENT DOCUMENTS

| | | |
|---|---|---|
| 2009/0089489 A1 | 4/2009 | Mukaida et al. |
| 2009/0157952 A1 | 6/2009 | Kim et al. |
| 2009/0182936 A1 | 7/2009 | Lee |
| 2009/0248962 A1 | 10/2009 | Kim et al. |
| 2009/0310413 A1 | 12/2009 | Lasser |
| 2010/0185804 A1* | 7/2010 | Omizo et al. ........... 711/103 |
| 2010/0246266 A1 | 9/2010 | Park et al. |
| 2011/0138222 A1* | 6/2011 | Haines et al. ........... 714/6.12 |
| 2011/0276740 A1 | 11/2011 | Joo et al. |
| 2011/0283051 A1* | 11/2011 | Lieber et al. ........... 711/103 |
| 2011/0307721 A1* | 12/2011 | Ouchi et al. ........... 713/321 |
| 2014/0032822 A1* | 1/2014 | Oh ........... 711/103 |

FOREIGN PATENT DOCUMENTS

| | | |
|---|---|---|
| KR | 10-2007-0099234 A | 10/2007 |
| KR | 10-2009-0077538 A | 7/2009 |
| KR | 10-2010-0053782 A | 5/2010 |
| KR | 10-2010-0107174 A | 10/2010 |

* cited by examiner

BLKi of MRAM

NONVOLATILE MEMORY DEVICE HAVING WEAR-LEVELING CONTROL AND METHOD OF OPERATING THE SAME

CROSS-REFERENCE TO RELATED APPLICATIONS

A claim for priority under 35 U.S.C. §119 is made to Korean Patent Application No. 10-2012-0084078, filed on Jul. 31, 2012, in the Korean Intellectual Property Office, the entire contents of which are hereby incorporated by reference.

BACKGROUND

Embodiments of the present inventive concept relate to use of nonvolatile memory devices, and more particularly, to a method of controlling data writing of a nonvolatile memory device and a memory controller having a wear-leveling controlling function Recently, magnetic random access memory (MRAM) has been studied as memory able to replace not only flash memory for data storage, but also dynamic random access memory (DRAM) for working storage. To replace DRAM with MRAM, memory endurance has to be increased.

In flash memory, wear-leveling techniques are used for equalizing the number of erasures of memory blocks. However, when block size increases significantly due to high capacity of the memory, an endurance difference occurs between word lines in the same memory block. This is because when block size becomes very large, a merge operation may be performed before memory cells connected to word lines in each block are all written. Consequently, all the memory cells connected to word lines in a memory block are not evenly used. For instance, word lines located closer to a memory area in which a write operation of the memory block begins are used relatively often, and word lines located further away from the memory area in which the write operation begins are less frequently used. Thus, wear-levels between word lines in the memory block may differ substantially.

SUMMARY

Embodiments of the inventive concept provide a method of controlling a write operation in a nonvolatile memory device to provide wear leveling, where the nonvolatile memory device includes multiple memory blocks. The method includes reading write indication information with respect to at least a selected memory block of the multiple memory blocks; determining whether a write order of data to be stored in the selected memory block is an ascending order or a descending order, based on the write indication information of the selected memory block; and generating addresses of memory regions in the selected memory block in an ascending order when the write order of the data is determined to be an ascending order, and generating addresses of the memory regions in the selected memory block in a descending order when the write order is determined to be a descending order.

Embodiments of the inventive concept also provide a memory controller including an address conversion controller and an address generator. The address conversion controller is configured to convert logical addresses, applied when a write operation is performed on a memory block in a nonvolatile memory device, into physical addresses in an ascending order or a descending order according to write indication information of the memory block. The address generator is configured to receive the physical addresses and to generate corresponding row select addresses for selecting at least one memory region of a plurality of memory regions in the memory block.

Embodiments of the inventive concept also provide a nonvolatile memory device that includes a memory cell array, a counting value memory and control logic. The memory cell array includes multiple memory blocks, each memory block including multiple memory regions. The counting value memory is configured to store write indication information with respect to each memory block. The control logic is configured to perform a write operation according to a write order of data to be stored in a selected memory block of the memory blocks, the write order being one of an ascending order or a descending order of memory regions in the selected memory block determined based on the stored write indication information with respect to the selected memory block.

BRIEF DESCRIPTION OF THE FIGURES

Exemplary embodiments of the inventive concept will be more clearly understood from the following detailed description taken in conjunction with the accompanying drawings. The embodiments of the inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

DETAILED DESCRIPTION OF THE EMBODIMENTS

Figure 1:
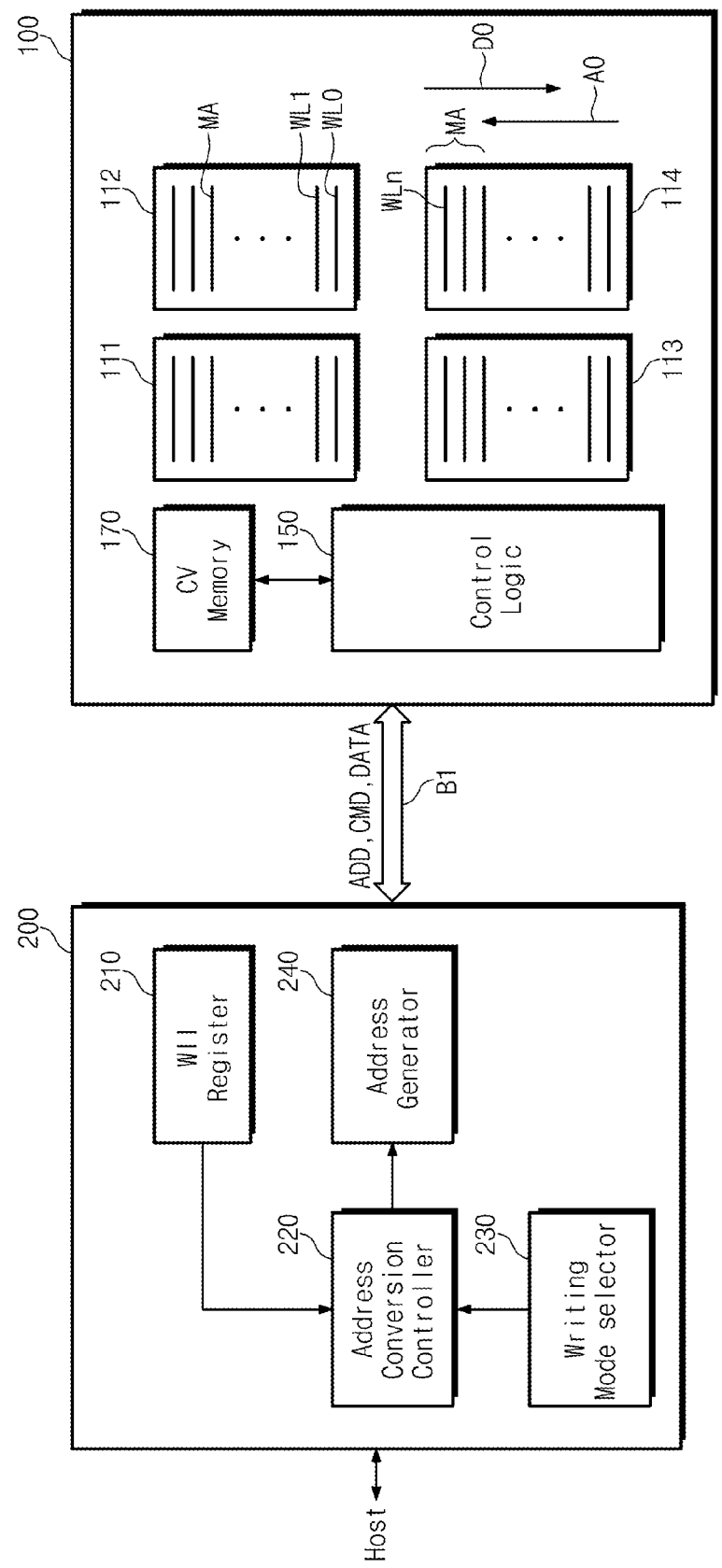
FIG. 1 is a block diagram of an illustrative memory system, in accordance with an embodiment of the inventive concept.

Embodiments of the inventive concept will now be described more fully with reference to the accompanying drawings, in which exemplary embodiments of the inventive concept are shown. The inventive concept may, however, be embodied in many different forms and should not be construed as being limited to the embodiments set forth herein. Rather, these embodiments are provided so that this disclosure will be thorough and complete, and will fully convey the concept of the inventive concept to one of ordinary skill in the art. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the inventive concept. In the drawings, the size and relative sizes of layers and regions may be exaggerated for clarity, and like reference numerals denote like elements throughout.

FIG. 1 is a block diagram of an illustrative memory system, in accordance with an embodiment of the inventive concept.

Referring to FIG. 1, a memory system includes a nonvolatile memory device 100 constituted by MRAM or flash memory, and a memory controller 200 for controlling erase operations, write operations and read operations of the nonvolatile memory device 100, as well as wear-leveling operations of memory areas or word lines in a memory block.

The memory controller 200 includes a WII register 210 that stores write indication information WII, an address conversion controller 220 that converts logical addresses applied when a write operation is performed into physical addresses in ascending order or descending order according to the write indication information WII of the respective memory block received from a nonvolatile memory device, and an address generator 240 that receives the physical addresses to generate row select addresses for selecting at least one of multiple memory areas in a selected memory block of the nonvolatile memory device. The memory controller 200 furthers include a writing mode selector 230 that responds to an external command and/or selects a write mode which may be autonomously set, so that a wear leveling control mode is selected and wear leveling is performed according to embodiments of the inventive concept.

In FIG. 1, the nonvolatile memory device 100 includes a memory cell array including multiple memory blocks, indicated by representative memory blocks 111, 112, 113 and 114, control logic 150, and counting value memory 170. The control logic 150 is connected to the memory controller 200 through a bus B1 to control internal operation of the nonvolatile memory device 100. The counting value memory 170 is connected to the control logic 150 to store counting values related to the write indication information WII.

Memory block 114 of the memory blocks 111, 112, 113 and 114 may include multiple memory areas MA. Each memory area MA includes at least one word line WL and memory cells connected to the at least one word line WL. That is, one memory area may include memory cells connected to one word line or memory cells connected to two or more word lines. In various embodiments, one memory area is accessed by a row address for selecting one word line or a row address for selecting multiple word lines.

When controlling wear-leveling in accordance with embodiments of the inventive concept, the write order may be alternated between ascending and descending orders. An ascending order means that the write order is sequentially performed from a low order word line WL0 toward a high order word line WLn, as indicated by arrow A0. A descending order means that the write order is sequentially performed from a high order word line WLn toward a low order word line WL0, as indicated by arrow D0. A beginning address of the physical addresses of the ascending order may be the lowest order address or a middle order address, and a beginning address of the physical addresses of the descending order may be the highest order address or a middle order address.

The write indication information WII may include an erase counting value with respect to the memory block indicating the number of times an erase operation has been performed on the memory block. The write indication information WII may include a power-on counting value or a power-off counting value indicating the number of times the memory block has been powered-on or powered-off, respectively.

In various embodiments, when the erase counting value is an odd number, the write order with respect to the multiple memory areas (or word lines) may be determined to be an ascending order. When the erase counting value is an even number, the write order with respect to the memory areas (or word lines) may be determined to be a descending order. Alternatively, when the erase counting value is an odd number, the write order with respect to the memory areas (or word lines) may be determined to be a descending order, and when the erase counting value is an even number, the write order with respect to the memory areas (or word lines) may be determined to be an ascending order.

When the memory areas in a memory block are alternately programmed in ascending order and descending order according to the write indication information WII, the differences in wear levels among the memory areas or among word lines is minimized or reduced. Because the memory areas or the word lines in the memory block are evenly accessed according to the write indication information WII when write operations are performed, the life of the nonvolatile memory device increases.

Figure 2:
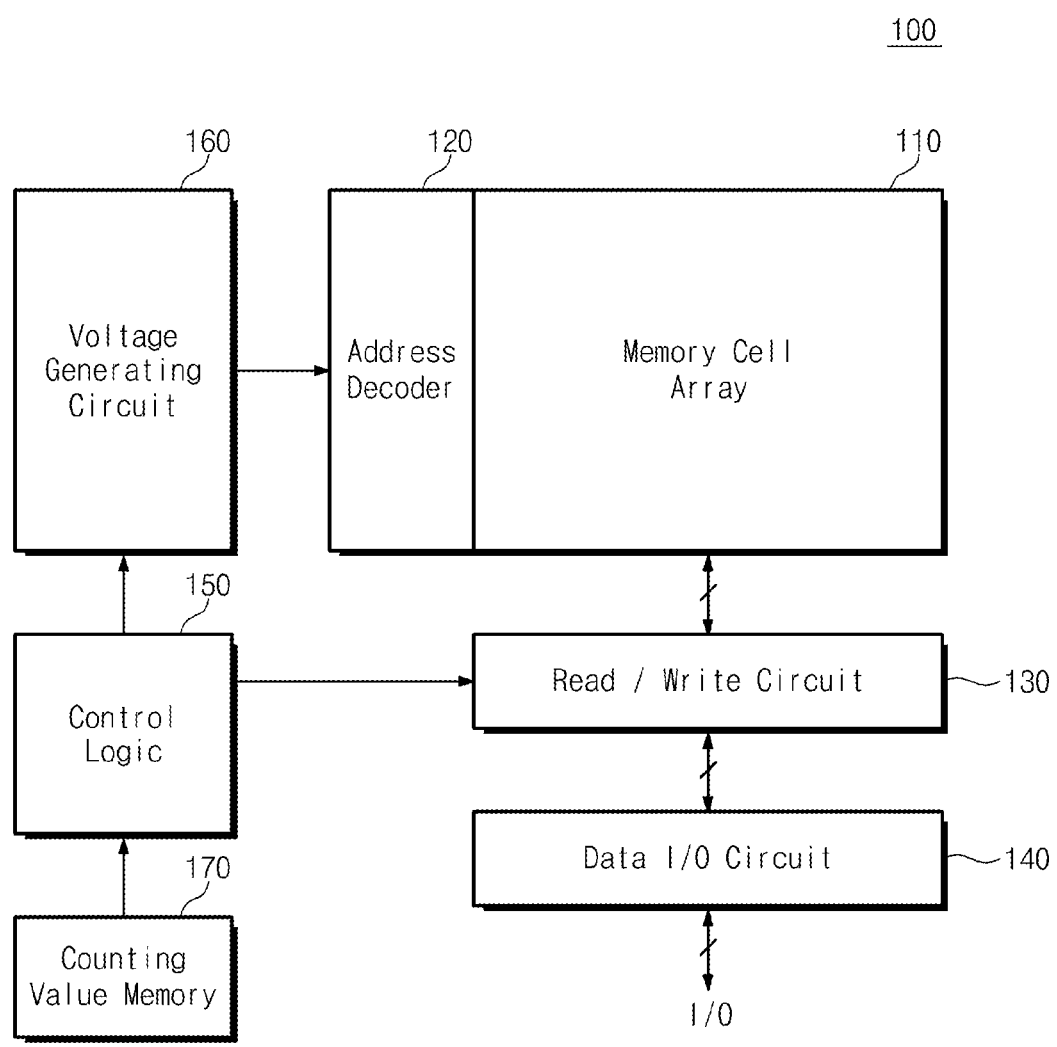
FIG. 2 is a block diagram of an illustrative nonvolatile memory device of FIG. 1, in accordance with an embodiment of the inventive concept.

FIG. 2 is a block diagram of an illustrative nonvolatile memory device of FIG. 1, in accordance with an embodiment of the inventive concept.

Referring to FIG. 2, the nonvolatile memory device 100 includes a memory cell array 110, an address decoder 120, a read/write circuit 130, a data input/output circuit (I/O) 140, control logic 150, a voltage generating circuit 160 and a counting value memory 170.

Figure 3:
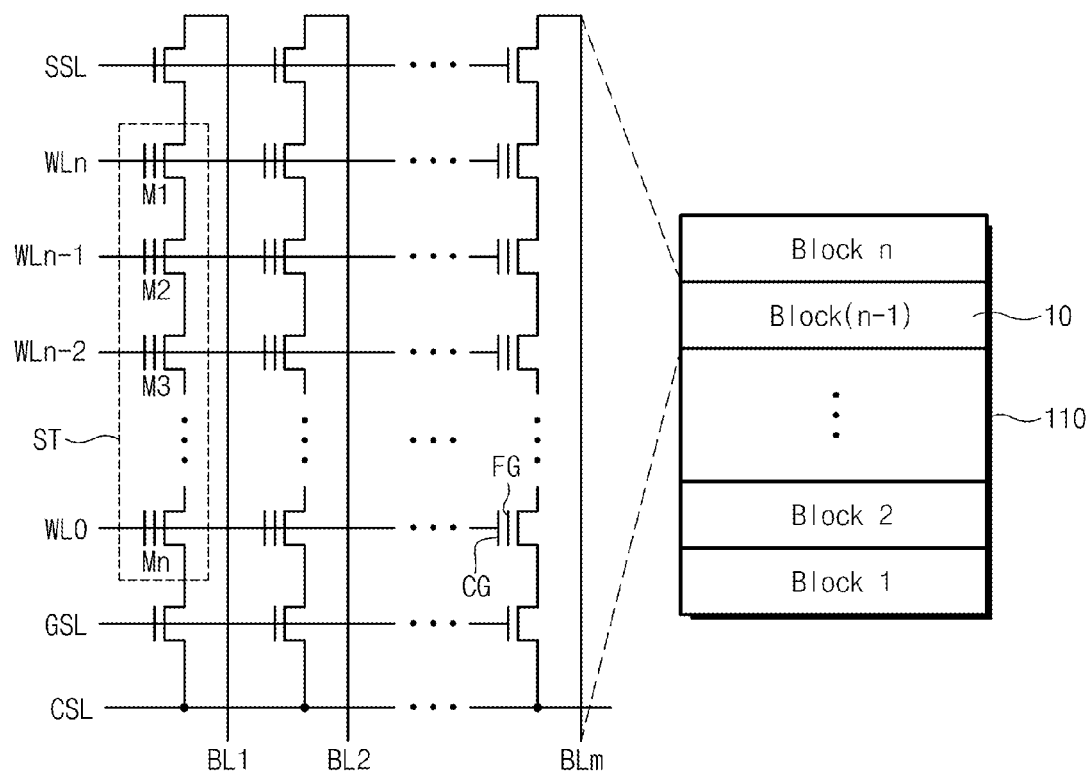
FIG. 3 is a circuit diagram illustrating a flash memory block implementation of the memory cell array of FIG. 2, in accordance with an embodiment of the inventive concept.

When the memory cell array 110 is a MRAM memory cell array, it may include memory cells arranged by rows (or word lines) and columns (or bit lines). Also, when the memory cell array 110 is a flash memory cell array, it may be a NAND type memory block, an example of which is shown in FIG. 3.

The memory cell array 110 may include a main area for storing general data and a spare area for storing additional information, such as flag information, error correction code, device code, maker code, and page information, for example, related to the main area and the general data.

When the memory cell array 110 includes a NAND type flash memory, program operations and read operations are performed by page units and erase operations of programmed data are performed by block units (formed of multiple pages). Information related to a program operation or an erase operation with respect to each page may be stored in memory cells assigned in the spare area (or a part area of the main area). The main area and the spare area are not limited to a specific form, and may be arranged in various alternative forms in the memory cell array 110 without departing from the scope of the present teachings. The number of bits stored in each memory cell included in the main area and each memory cell included in the spare area may be realized in various forms.

Each memory block in the memory cell array 110 can be subdivided into multiple memory areas. Each subdivided memory area may correspond to one or more word lines (or one or more pages).

The read/write circuit 130 is controlled by the control logic 150 and operates as a sense amplifier or a write driver depending on the operation mode. When a write (program) operation is performed, the read/write circuit 130 operates as a write driver driving selected bit lines to store data in a selected memory block in the memory cell array 110. To achieve this, the read/write circuit 130 may include multiple page buffers (not shown) corresponding to columns (or bit lines) or pairs of columns (pairs of bit lines). When a read operation is performed, the read/write circuit 130 operates as a sense amplifier for reading data from the memory cell array 110. Read operations performed by the read/write circuit 130 are not limited to the main area, and may be applied to the spare area. Thus, the read/write circuit 130 performs read operations for reading general data, as well as additional information, such as the write indication information WII. The general data read by the read/write circuit 130 is output to the outside (for example, a memory controller or a host) through a buffer. An erase/program counting value read by the read/write circuit 130 may be provided to the control logic 150.

The control logic 150 controls write operations under control of the memory controller 200. That is, the control logic 150 writes data in the memory areas MA in an ascending order or a descending order. The control logic 150 controls the address decoder 120, the voltage generating circuit 160 and the read/write circuit 130 according to whether data is written in the ascending order or the descending order.

The voltage generating circuit 160 generates word line voltages (for example, a program voltage Vpgm, a read voltage Vread, and a pass voltage Vpass) to be provided to word lines according to the operation mode and a voltage to be provided to a bulk (for example, a well area) in which memory cells are formed. A voltage generation operation of the voltage generating circuit 160 is performed under control of the control logic 150.

The address decoder 120 selects one of the memory blocks (or sectors) in the memory cell array 110 under control of the control logic 150 and selects at least one of the word lines (memory areas) in the selected memory block.

The counting value memory 170 is connected to the control logic 150 and stores a counting value related to the write indication information WII. The counting value related to the write indication information WII may be an erase counting value with respect to the memory block. The counting value related to the write indication information WII may be a power-on counting value or a power-off counting value with respect to the memory block. The counting values may be stored in the form of an accumulated value or simply as a 0 bit value or a 1 bit value according to odd numbered counting or even numbered counting, for example.

In case of storing an erase counting value, the counting value memory 170 may exist in each memory block set area. In case of storing a power-on and/or a power-off counting value, the counting value memory 170 does not need to exist at every memory block, and may exist in a specific area of the memory cell area 110.

In an embodiment, the control logic 150 only transmits the counting value stored in the counting value memory 170 to the memory controller 200 through the bus B1, and does not necessarily control a memory operation using the counting value. This is because the memory controller 200 determines row addresses in ascending order or descending order according to the counting value.

FIG. 3 is a circuit diagram illustrating a flash memory block implementation of the memory cell array of FIG. 2, in accordance with an embodiment of the inventive concept.

Referring to FIG. 3, the memory cell array 110 includes multiple memory blocks (e.g., Block 1, Block 2, . . . , Block n). Reference numeral 10 of FIG. 3 shows a configuration of one illustrative memory block (e.g., Block (n−1)). However, the configuration of memory block 10 illustrated in FIG. 3 may equally apply to memory blocks other than the selected memory block (Block (n−1)).

In case of a NAND type flash memory, each memory block includes multiple strings ("NAND strings") corresponding to multiple columns or bit lines BL1~BLm Each string includes a string select transistor, a plurality of memory cells (cell string: ST) and a ground select transistor. Each memory cell may be a MOSFET, for example, having a control gate CG and a floating gate FG.

In each string, a drain of the string select transistor is connected to a corresponding bit line and a source of the ground select transistor is connected to a common source line CSL. A plurality of memory cells is serially connected between a source of the string select transistor and a drain of the string select transistor. Control gates of the memory cells arranged in the same row are commonly connected to a corresponding word line among the word lines WL0~WLn. The string select transistor is controlled by a voltage applied through a string select line SSL and the ground select transistor is controlled by a voltage applied through a ground select line GSL. The memory cells are controlled by a voltage applied through a corresponding word line among the word lines W0~Wn. Memory cells connected to each word line store data corresponding to one page or multiple pages.

Figure 4:
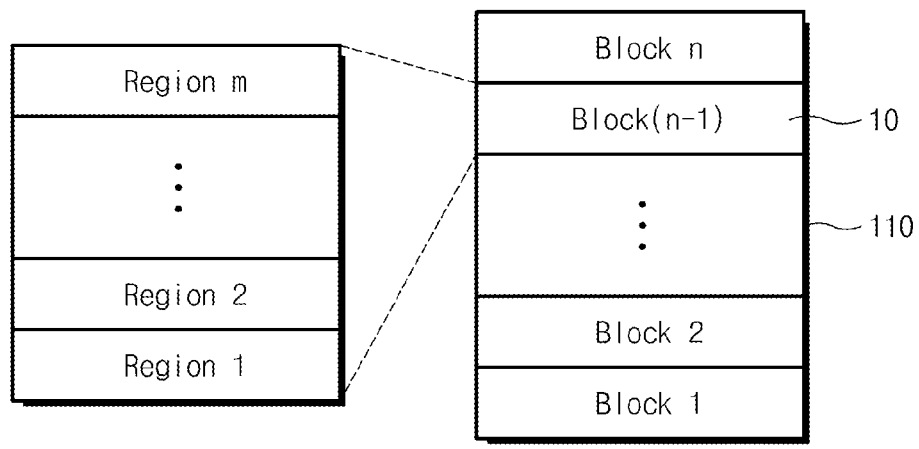
FIG. 4 is a block diagram illustrating an example of a division of memory areas in the memory block of FIG. 3, in accordance with an embodiment of the inventive concept.

FIG. 4 is a block diagram illustrating an example of a division of memory areas in the memory block of FIG. 3, in accordance with an embodiment of the inventive concept.

Figure 5:
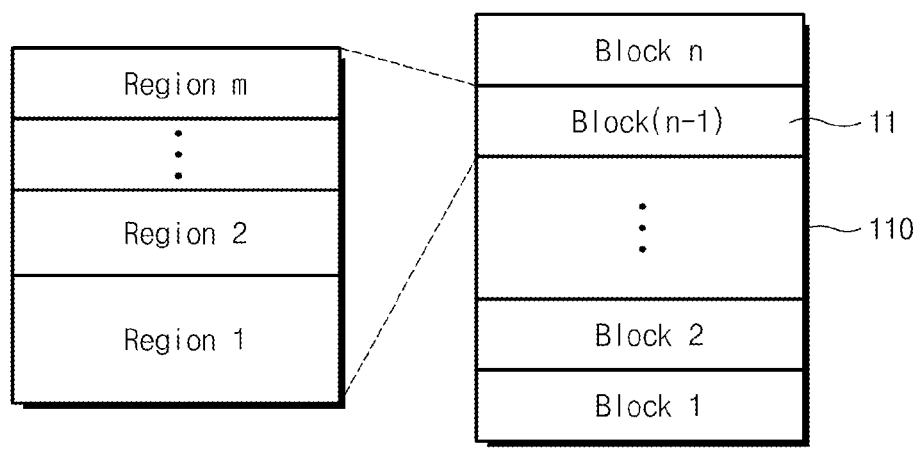
FIG. 5 is a block diagram illustrating an example of a division of memory areas in the memory block of FIG. 3, in accordance with another embodiment of the inventive concept.

FIG. 5 is a block diagram illustrating an example of a division of memory areas in the memory block of FIG. 3, in accordance with another embodiment of the inventive concept.

Referring to FIG. 4, each memory block 10 of the memory cell area 110 may be divided into multiple memory regions (Region 1, Region 2, ..., Region m) of the same size. Referring to FIG. 5, each memory block 11 of the memory cell area 110 may be divided into multiple memory regions (Region 1, Region 2, ..., Region m) having different sizes. Each memory region may include one or more word lines (or pages). Divided forms of the memory blocks 10 and 11 illustrated in FIGS. 4 and 5, and the size of each memory region which is divided may be diversely changed.

Figure 6:
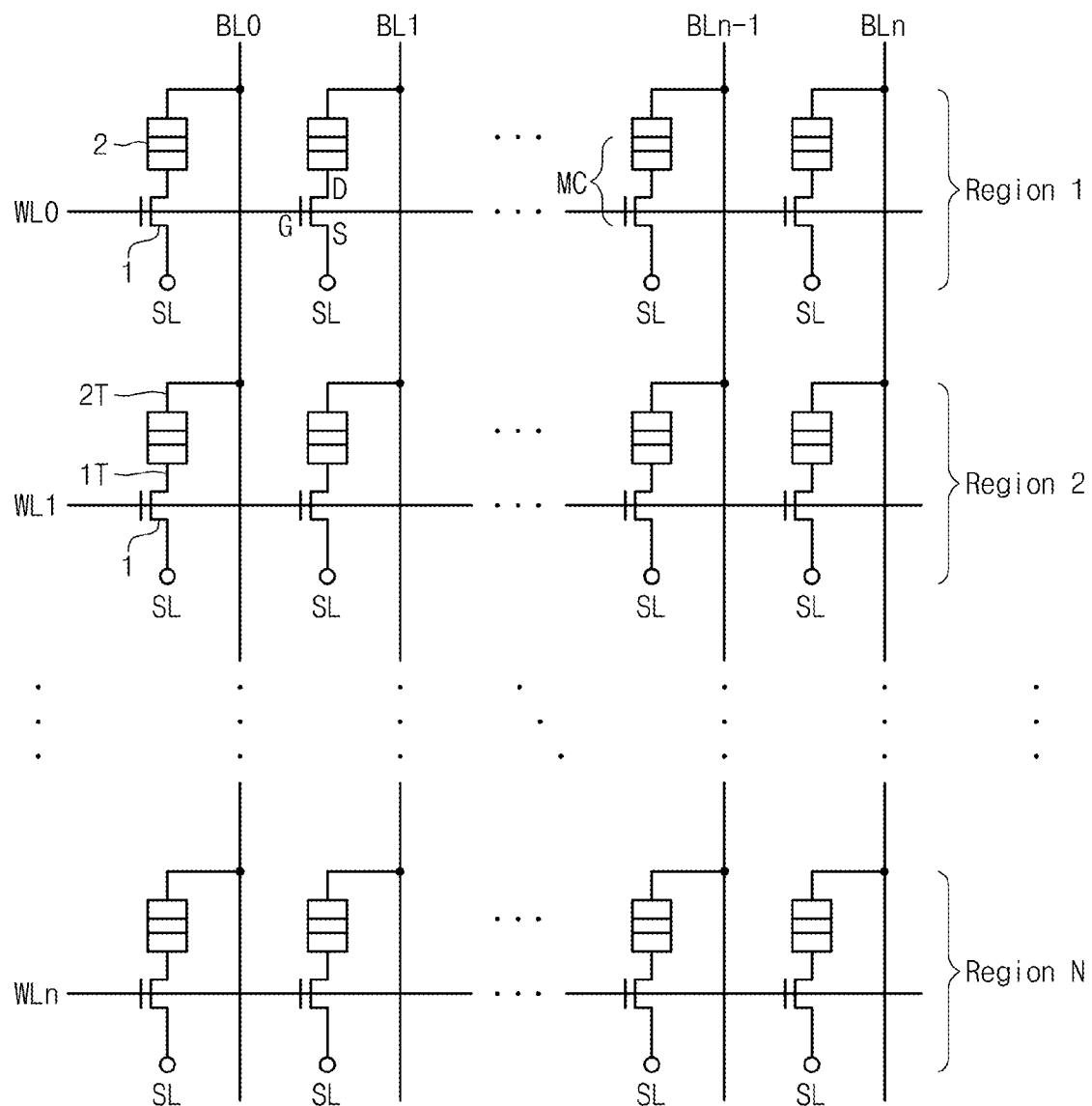
FIG. 6 is a circuit diagram illustrating a magnetic memory block implementation of the memory cell array of FIG. 2, in accordance with an embodiment of the inventive concept.

FIG. 6 is a circuit diagram illustrating a magnetic memory block implementation of the memory cell array of FIG. 2, in accordance with an embodiment of the inventive concept.

Referring to FIG. 6, in the case of a memory block of MRAM, each memory block is divided into multiple memory regions (Region 1, Region 2, ..., Region N). In FIG. 6, cell transistors 1 are two dimensionally arranged in a row direction and a column direction. Each cell transistor 1 includes a gate G, a source S and a drain D. The cell transistor 1 may be a MOSFET formed on a semiconductor substrate, for example. Word lines WL0~WLn and bit lines BL0~BLn are arranged in row and column directions, respectively, and are connected to the gates G and the drains D of the cell transistors 1, respectively.

A magnetic tunnel junction MTJ 2 is disposed between the bit line BLi and each cell transistor 1. The MJT 2 is used for storing information in a MRAM. The cell transistor 1 and the MTJ 2 form a unit cell MC of a magnetic memory.

The unit cell MC may be arranged in two dimensions or in three dimensions. That is, a plane including cells of the magnetic memory may be the plural number. The magnetic memory may include or not include a semiconductor substrate on which transistors are formed. The unit cell MC may not include a cell transistor 1. In this case, the magnetic memory may be connected to a functional circuit constituted by transistors. The magnetic memory may be connected to the functional circuit using wire bonding, flip-chip bonding and solder bumps that are used in a chip package.

A first terminal 1T between the MTJ 2 and the cell transistor 1 may be an anti-ferromagnetic layer formed of at least one selected from a group consisting of IrMn, PtMn, MnO, MnS, MnTe, $MnF_2$, $FeF_2$, $FeCl_2$, FeO, $CoCl_2$, CoO, $NiCl_2$, NiO and Cr, or may be a ferromagnetic layer formed of at least one selected from a group consisting of Fe, Co, Ni, Gd, Dy, MnAs, MnBi, MnSb, $CrO_2$, $MnOFe_2O_3$, $FeOFe_2O_3$, $NiOFe_2O_3$, $CuOFe_2O_3$, EuO and $Y_3Fe_5O_{12}$. A second terminal 2T between the MTJ 2 and the bit line BL may be a ferromagnetic layer formed of at least one selected from a group consisting of Fe, Co, Ni, Gd, Dy, MnAs, MnBi, MnSb, $CrO_2$, $MnOFe_2O_3$, $FeOFe_2O_3$, $NiOFe_2O_3$, $CuOFe_2O_3$, EuO and $Y_3Fe_5O_{12}$.

An insulating layer, such as aluminum, may be disposed between the first terminal 1T and the second terminal 2T. The insulating layer may be connected to the ferromagnetic layer of the first terminal 1T and the ferromagnetic layer of the second terminal 2T. The MTJ 2 as an information storage device may have a rectangular shape where a horizontal length and a vertical length are different from each other.

Advantages of the MRAM having memory regions as depicted in FIG. 6 include that it is nonvolatile, can be unlimitedly reused, is highly integrated with ease and can operate at high speed and at low voltage. The MRAM includes a magnetic tunnel junction formed by a pinning layer, a pinned layer, an insulating layer and a free layer. A resistance of the magnetic tunnel junction is determined by the magnetization direction of the free layer and the magnetization direction of the pinned layer. Performance of a data write operation determines the magnetization direction. Using a resistance characteristic which is dependent on the magnetization direction, the magnetic tunnel junction is used as a structure for storing information.

A read operation for reading information stored in a specific cell of the MRAM may be performed by measuring resistance of the magnetic tunnel junction, and then comparing the measured resistance with reference resistance. Methods of selecting the reference resistance include an external reference scheme and a self reference scheme. The external reference scheme uses resistance of a predetermined reference device as the reference resistance, and the self reference scheme uses resistance of a different state of the magnetic tunnel junction as the reference resistance.

As described with reference to FIG. 6, each memory block may be divided into multiple memory regions (Region 1, Region 2, ..., Region N). In this case, to minimize or reduce deviations in wear level, when a write operation is performed, word lines are sequentially selected in an ascending order or in a descending order, depending on the write indication information WII.

Notably, flash memory and MRAM were described above as examples of nonvolatile memory devices. However, embodiments of the inventive concept are not limited thereto, and other types of nonvolatile memory devices may be incorporated without departing from the scope of the present teachings.

The nonvolatile memory device may be used as a data storage, such as electrically erasable programmable read-only memory (EEPROM), spin-transfer torque MRAM, conductive bridging RAM (CBRAM), ferroelectric RAM (Fe-RAM), phase change RAM (PRAM) which is called ovonic unified memory (OUM), resistive RAM (RRAM), nanotube RRAM, polymer RAM (PoRAM), nanotube floating gate memory (NFGM), holographic memory, molecular electronics memory device, or insulator resistance change memory.

Figure 7:
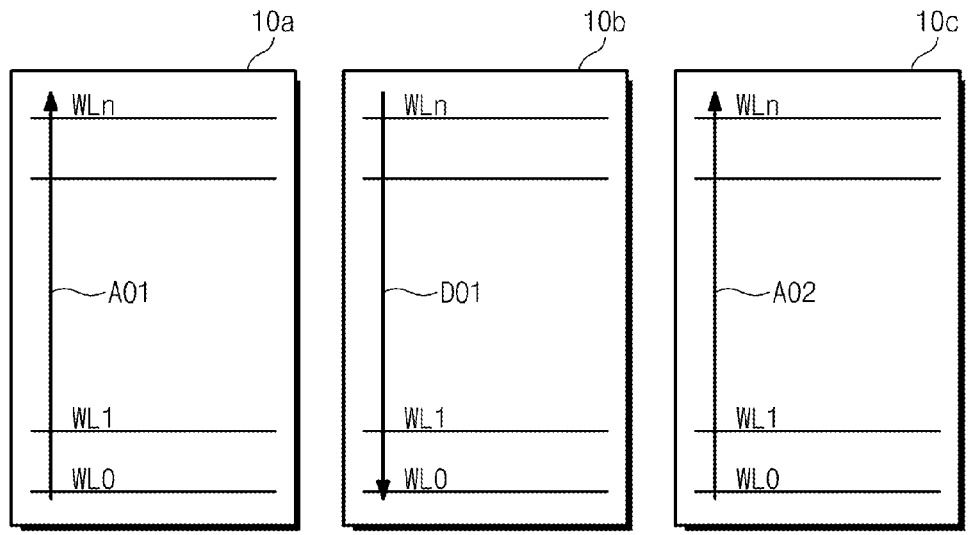
FIG. 7 is a block diagram illustrating word line selection order in a memory block according to write indication information when controlling a write operation, in accordance with an embodiment of the inventive concept.

FIG. 7 is a block diagram illustrating word line selection order in a memory block according to write indication information when controlling a write operation, in accordance with an embodiment of the inventive concept. In particular, memory block 10 is shown subject to various write orders, indicated by memory blocks 10a to 10c.

Referring to memory block 10a, the write order is determined to be an ascending order by the write indication information WII. That is, the word lines (or memory regions) are sequentially enabled in an ascending order, as indicated by arrow A01. Thus, a first word line WL0 is enabled first, a second word line WL1 is enabled second, and so on until an nth word line Wn is enabled last in the memory block 10a.

If an erase counting value or a power-on/power-off counting value with respect to the memory block 10a is changed or increased, the write order may be determined to be a descending order by the write indication information WII. That is, the word lines (or memory regions) are sequentially enabled in a descending order, as indicated by arrow D01 in memory block 10b. Thus, the nth word line WLn is enabled first, an n−1th word line WLn−1 is enabled second, and so on until the first word line WL0 is enabled last.

If an erase counting value or a power-on/power-off counting value with respect to the memory block 10b is changed or increased, the write order may be returned to an ascending order by the write indication information WII. In this case, the word lines (or memory regions) are sequentially enabled in an ascending order, as indicated by arrow A02 in memory block 10c. Thus, the first word line WL0 is enabled first, the second word line WL1 is enabled second, and so on until the nth word line WLn is enabled last. Alternately enabling the memory regions or the word lines as shown in FIG. 7 minimizes or reduces wear level deviation among the memory regions or the word lines.

Figure 8:
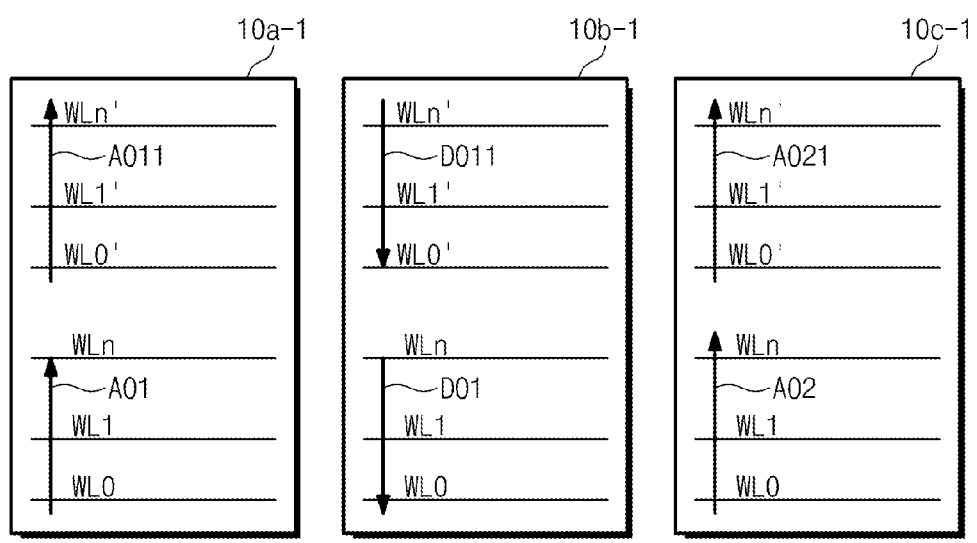
FIG. 8 is a block diagram illustrating word line selection order in a memory block according to write indication information when controlling a write operation, in accordance with an embodiment of the inventive concept.

FIG. 8 is a block diagram illustrating word line selection order in a memory block according to write indication information when controlling a write operation, in accordance with an embodiment of the inventive concept. In particular, memory block 10 is shown subject to various write orders, indicated by memory blocks 10a-1 to 10c-1.

Referring to FIG. 8, a selected write order of word lines in a memory block is shown, when two word lines are sequentially enabled at the same time in response to one address.

If the write order is determined to be an ascending order by the write indication information WII, the word lines (or memory regions) are sequentially enabled in an ascending order, as indicated by arrows A01 and A011 in memory block 10a-1. Thus, a low-order first word line WL0 and a high-order first word line WL0' are enabled at the same time, then a low-order second word line WL1 and a high-order second word line WL1' are enabled at the same time, and so on until a low-order nth word line WLn and a high-order nth word line WLn' are enabled last.

If an erase counting value or a power-on/power-off counting value with respect to the memory block 10a-1 is changed or increased, the write order may be determined to be a descending order by the write indication information WII. That is, the word lines (or memory regions) are sequentially enabled in a descending order, as indicated by arrows D01 and D011 in memory block 10b-1. Thus, the high-order nth word line WLn and the low-order nth word line WLn' are enabled at the same time, then a high-order n−1th word line WLn−1 and a low-order n−1th word line WLn−1' are enabled at the same time, and so on until the high-order first word line WL0 and the low-order first word line WL0' are enabled last.

If an erase counting value or a power-on/power-off counting value with respect to the memory block 10b-1 is changed or increased, the write order may be returned to an ascending order by the write indication information WII. That is, the word lines (or memory regions) are sequentially enabled in an ascending order, as indicated by arrows A02 and A021 in memory block 10c-1. Thus, the low-order first word line WL0 and the high-order first word line WL0' are enabled at the same time, then the low-order second word line WL1 and the high-order second word line WL1' are enabled at the same time, and so on until the low-order nth word line WLn and the high-order nth word line WLn' are enabled last. Alternately enabling the memory regions or the word lines according to the write indication information WII as shown in FIG. 8 minimizes or reduces wear level deviation among the memory regions or the word lines.

Figure 9:
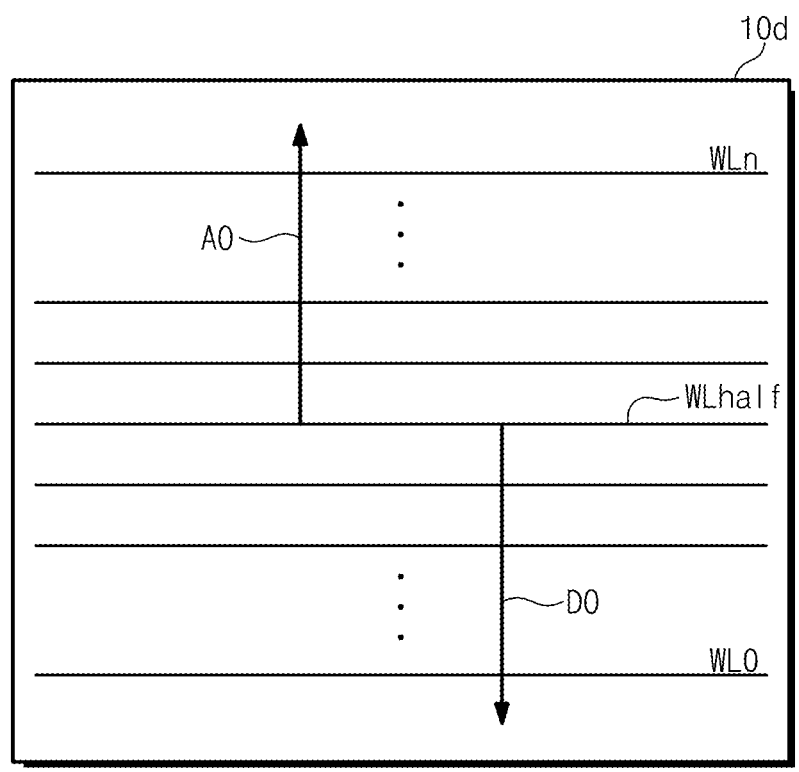
FIG. 9 is a block diagram illustrating word line selection order in a memory block by setting a middle word line as a beginning word line, in accordance with an embodiment of the inventive concept.

FIG. 9 is a block diagram illustrating word line selection order in a memory block by setting a middle word line as a beginning word line, in accordance with an embodiment of the inventive concept. In particular, memory block 10d is shown subject to the depicted write order.

Referring to FIG. 9, when selecting word lines, a middle word line WLhalf in a memory block 10d is set as an enable beginning word line. Thus, if the write order is determined to be an ascending order by the write indication information WII, the word lines (or memory regions) are sequentially enabled in an ascending order, as indicated by arrow A0 in the memory block 10d. That is, the middle word line WLhalf is enabled first, then a high-order word line of the middle word line WLhalf is enabled, and so on until the nth word line WLn is enabled. After the nth word line WLn is enabled, word lines from the lowest-order word line WL0 to the word line just under the middle word line WLhalf are sequentially enabled.

If a write order is determined to be a descending order by the write indication information WII, the word lines (or memory regions) are sequentially enabled in a descending order, as indicated by arrow D0 in the memory block 10d. That is, the middle word line WLhalf is enabled first, then a low-order word line of the middle word line WLhalf is enabled, and so on until the first word line WL0 is enabled. After the first word line WL0 is enabled, word lines from the highest-order word line WLn to the word line just over the middle word line WLhalf are sequentially enabled. Setting the middle word line in the memory block as an enable beginning word line, and then alternately enabling the memory regions or the word lines according to the write indication information WII as shown in FIG. 9 minimizes or reduces wear level deviation among the memory regions or the word lines.

Figure 10:
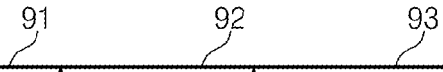
FIG. 10 illustrates an example of mapping logical addresses and physical addresses when controlling a writing operation, in accordance with an embodiment of the inventive concept.

FIG. 10 illustrates an example of mapping logical addresses and physical addresses when controlling a writing operation, in accordance with embodiments of the inventive concept.

Referring to FIG. 10, reference numeral 91 indicates a logical address region which provides logical addresses LADD. Reference numeral 92 indicates a physical address region which provides physical addresses PADD1 for an ascending order enable operation. Reference numeral 93 indicates a physical address region which provides physical addresses PADD2 for a descending order enable operation.

In FIG. 10, when a logical address LADD of "0" is provided to the memory controller 200 from a host and the write indication information WII indicates ascending order information, the address conversion controller 220 in the memory controller 200 outputs a physical address PADD1 of "1" corresponding to the lowest-order word line. Also, when a logical address LADD of "1" is provided, a physical address PADD1 of "2" is output. When a logical address LADD of "2" is provided, a physical address PADD1 of "3" is output. Thus, like the arrow A01 of FIG. 7, word lines (or memory regions) are sequentially enabled in an ascending order.

When a logical address LADD of "0" is provided to the memory controller 200 from a host and the write indication information WII indicates descending order information, the address conversion controller 220 in the memory controller 200 outputs a physical address PADD2 of "N" corresponding to the highest-order word line. Also, when a logical address LADD of "1" is provided, a physical address PADD2 of "N−1" is output. When a logical address LADD of "2" is provided, a physical address PADD2 of "N−2" is output. Thus, like the arrow D01 of FIG. 7, word lines (or memory regions) are sequentially enabled in a descending order.

Figure 11:
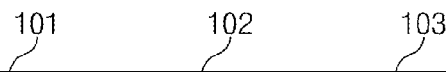
FIG. 11 illustrates an example of mapping logical addresses and physical addresses when controlling a writing operation, in accordance with another embodiment of the inventive concept.

FIG. 11 illustrates an example of mapping logical addresses and physical addresses when controlling a writing operation, in accordance with another embodiment of the inventive concept.

Referring to FIG. 11, reference numeral 101 indicates a logical address region which provides logical addresses LADD. Reference numeral 102 indicates a physical address region which provides physical addresses PADD1 for an ascending order enable operation. Reference numeral 103 indicates a physical address region which provides physical addresses PADD2 for a descending order enable operation.

In FIG. 11, when a logical address LADD of "0" is provided to the memory controller 200 from a host and the write indication information WII indicates ascending order information, the address conversion controller 220 in the memory controller 200 outputs a physical address PADD1 of "1". Also, when a logical address LADD of "1" is provided, a physical address PADD1 of "2" is output. When a logical address LADD of "2" is provided, a physical address PADD1 of "4" is output. In this case, a physical address PADD1 of "3" should be output, but if data is stored in a corresponding page of a flash memory, an overwrite operation cannot be performed. That is, since an overwrite operation cannot be performed, the physical address PADD1 of "4" is output. Accordingly, as shown by the arrow A01 of FIG. 7, word lines (or memory regions) are sequentially enabled in an ascending order, except word lines in which overwrite operations are prohibited.

When a logical address LADD of "0" is provided to the memory controller 200 from a host and the write indication information WII indicates descending order information, the address conversion controller 220 in the memory controller 200 outputs a physical address PADD2 of "N". Also, when a logical address LADD of "1" is provided, a physical address PADD2 of "N–1" is output. When a logical address LADD of "2" is provided, a physical address PADD2 of "N–3" is output. In this case, a physical address PADD2 of "N–3" should be output, but because data is stored in a corresponding memory page, an overwrite operation cannot be performed. Accordingly, as shown by the arrow D01 of FIG. 7, word lines (or memory regions) are sequentially enabled in a descending order, except word lines in which overwrite operations are prohibited.

Figure 12:
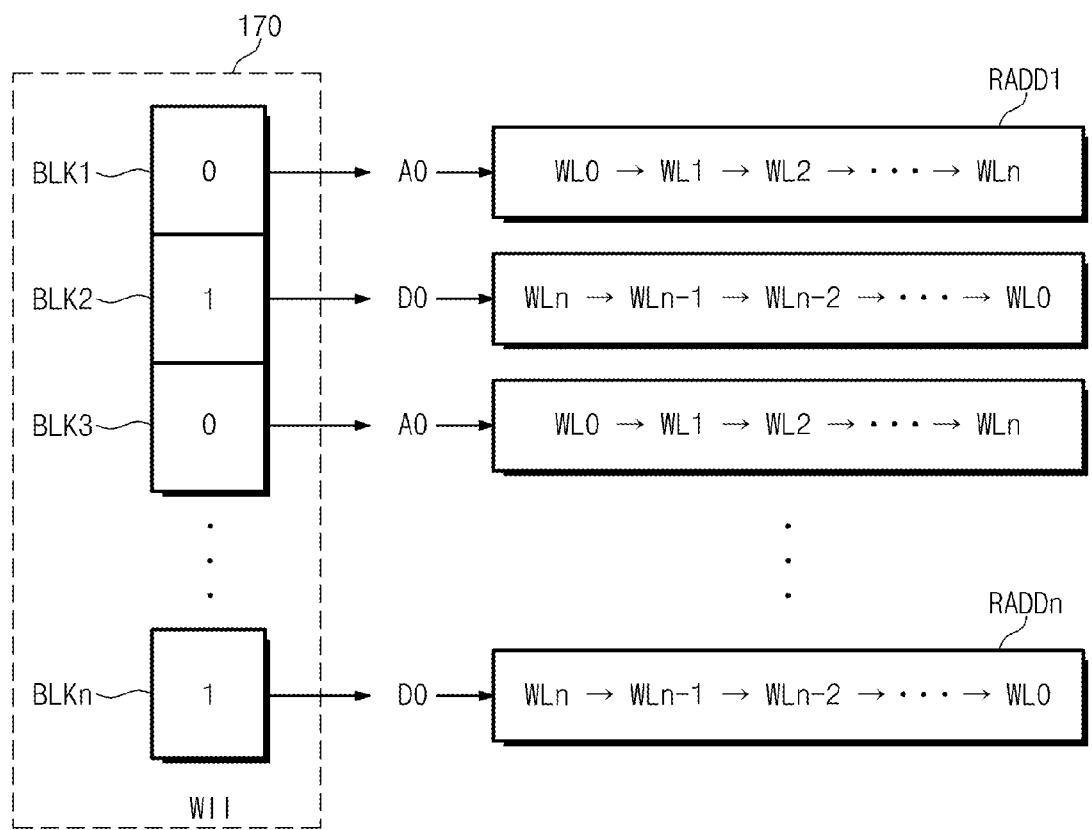
FIG. 12 is a block diagram illustrating ascending and descending orders of write orders in accordance with flag type write indication information for controlling writing operations, in accordance with an embodiment of the inventive concept.

FIG. 12 is a block diagram illustrating ascending and descending orders of write orders provided in accordance with flag type write indication information for controlling writing operations, in accordance with an embodiment of the inventive concept.

Referring to FIG. 12, write indication information WII of respective memory blocks stored in the counting value memory 170 of the nonvolatile memory device 100 of FIG. 1 is illustrated. For example, if the number of erase counts with respect to the first memory block BLK1 is an odd number, flag type WII may be stored as "0". Likewise, if the number of power on-counts or power-off counts with respect to the first memory block BLK1 is an odd number, the flag type WII may be stored as "0". The counting value memory 170 may be arranged in the spare area of the memory cell array, for example. In this case, the memory controller 200 may read information stored in the counting value memory 170 through the bus B1, e.g., when a power up of the memory device is performed, and store the read information in the WII register 210. An erase counting value stored in the WII register 210 may be updated according to erasures of the corresponding memory block. Also, the updated erase counting value may be backed up in the counting value memory 170 of the corresponding memory block.

When the write indication information WII of the first memory block BLK1 is "0", the memory controller 200 determines the write order to be A0, which is an ascending order. As a result, physical addresses in an ascending order are output by the address conversion controller 220 and the address generator 240 sequentially generates an ascending order of row addresses RADD1. According to the ascending order of row addresses RADD1, word lines in the corresponding memory block of the nonvolatile memory device 100 are enabled in the order of WL0, WL1, WL2, . . . , WLn when a write operation is performed.

If the number of erase counts or power on/off counts with respect to a second memory block BLK2 is an even number, for example, the flag type WII may be stored as "1". Thus, when the write indication information WII of the second memory block BLK2 is "1", the memory controller 200 determines the write order to be D0 which is a descending order. As a result, descending order physical addresses are output by the address conversion controller 220 and the address generator 240 sequentially generates descending order row addresses. According to the descending order row address, word lines in the corresponding memory block of the nonvolatile memory device 100 are enabled in the order of WLn, WLn–1, WLn–2, . . . , WL0 when a write operation is performed.

If the number of power-on counts or power-off counts with respect to the third memory block BLK3 is an odd number, for example, the flag type WII may be stored as "0". Thus, when the write indication information WII of the third memory block BLK3 is "0", the memory controller 200 determines the write order to be A0 which is an ascending order and ascending order row addresses are provided, as discussed above. According to the ascending order row addresses, word lines in the corresponding memory block of the nonvolatile memory device 100 are activated in the order of WL0, WL1, WL2, . . . , WLn when a write operation is performed. Of course, the values of the flag type WII may be reversed with respect to ascending and descending orders, without departing from the scope of the present teachings.

Figure 13:
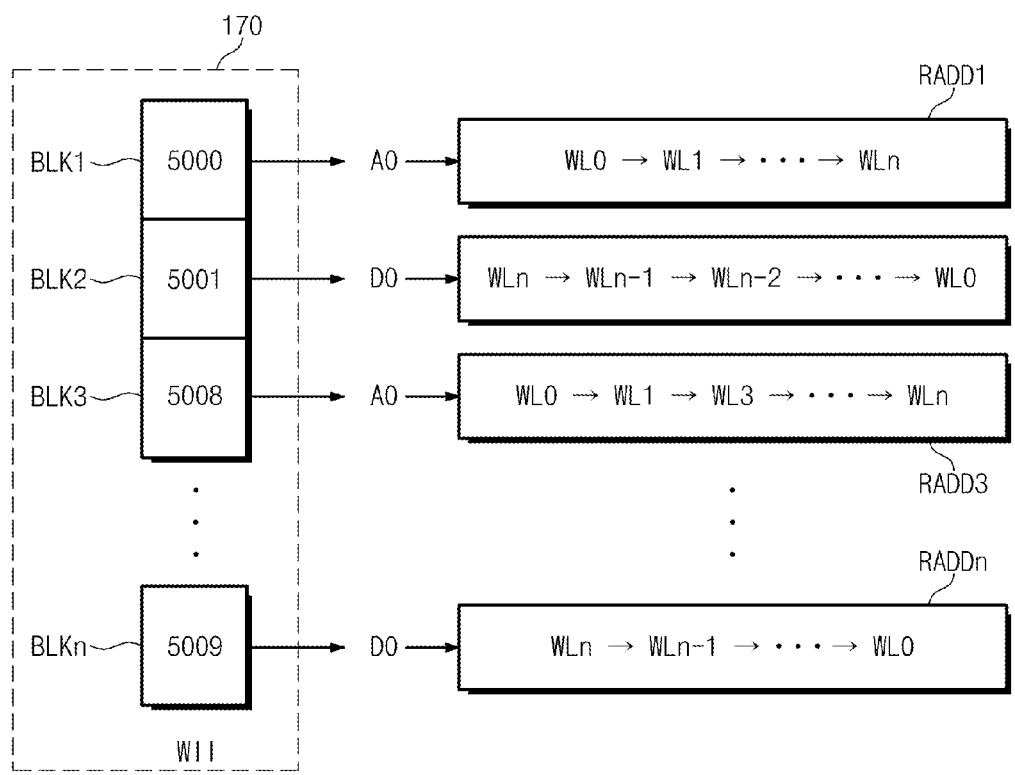
FIG. 13 is a block diagram illustrating ascending and descending orders of write orders provided in accordance with count type write indication information for controlling writing operations, in accordance with an embodiment of the inventive concept.

FIG. 13 is a block diagram illustrating ascending and descending orders of write orders provided in accordance with count type write indication information for controlling writing operations, in accordance with an embodiment of the inventive concept.

Referring to FIG. 13, the write indication information WII of the respective memory block stored in the counting value memory 170 of the nonvolatile memory device 100 of FIG. 1 is illustrated. If the number of erase counts or power-on/power-off counts with respect to the first memory block BLK1 is 5000, for example, count type WII may be stored as "5000". In this case, the memory controller 200 reads information stored in the counting value memory 170 through the bus B1 to store the read information in the WII register 210. Without storing the read information in the WII register 210, the memory controller 200 reads the information when necessary to determine whether the write order is an ascending order or a descending order. Thus, when the write indication information WII of the first memory block BLK1 is "5000" (e.g., an even number), the memory controller 200 can determine the write order to be A0, which is an ascending order. As a result, ascending order physical addresses are output by the address conversion controller 220 and the address generator 240 sequentially generates ascending order row address RADD1. According to the ascending order row addresses RADD1, word lines in the corresponding memory block of the nonvolatile memory device 100 are activated in the order of WL0, WL1, WL2, . . . , WLn when a write operation is performed.

If the number of erase counts or power-on/power-off counts with respect to the second memory block BLK2 is 5001, for example, the count type WII may be stored as "5001". When the write indication information WII of the second memory block BLK2 is "5001" (e.g., an odd number), the memory controller 200 determines the write order to be D0, which is a descending order. As a result, descending order physical addresses are output by the address conversion controller 220 and the address generator 240 sequentially generates descending order row addresses. According to the descending order row addresses, word lines in the corresponding memory block of the nonvolatile memory device 100 are activated in the order of WLn, WLn−1, WLn−2, . . . , WL0 when a write operation is performed.

If the number of erase counts or power-on/power-off counts with respect to the nth memory block BLKn is 5009, the count type WII may be stored as "5009". When the write indication information WII of the second memory block BLK2 is "5009", the memory controller 200 determines the write order to be D0, which is a descending order. According to the descending order row addresses, word lines in the corresponding memory block of the nonvolatile memory device 100 are activated in the order of WLn, WLn−1, WLn−2, . . . , WL0 when a write operation is performed. Of course, the criteria (e.g., even versus odd numbers) may be reversed with respect to ascending and descending orders, without departing from the scope of the present teachings.

An erase counting value and a program counting value of each memory block may be different from each other. This is because in a NAND type flash memory, a program operation or a read operation is performed by page units and an erase operation of programmed data is performed by block units which include multiple pages.

Figure 14:
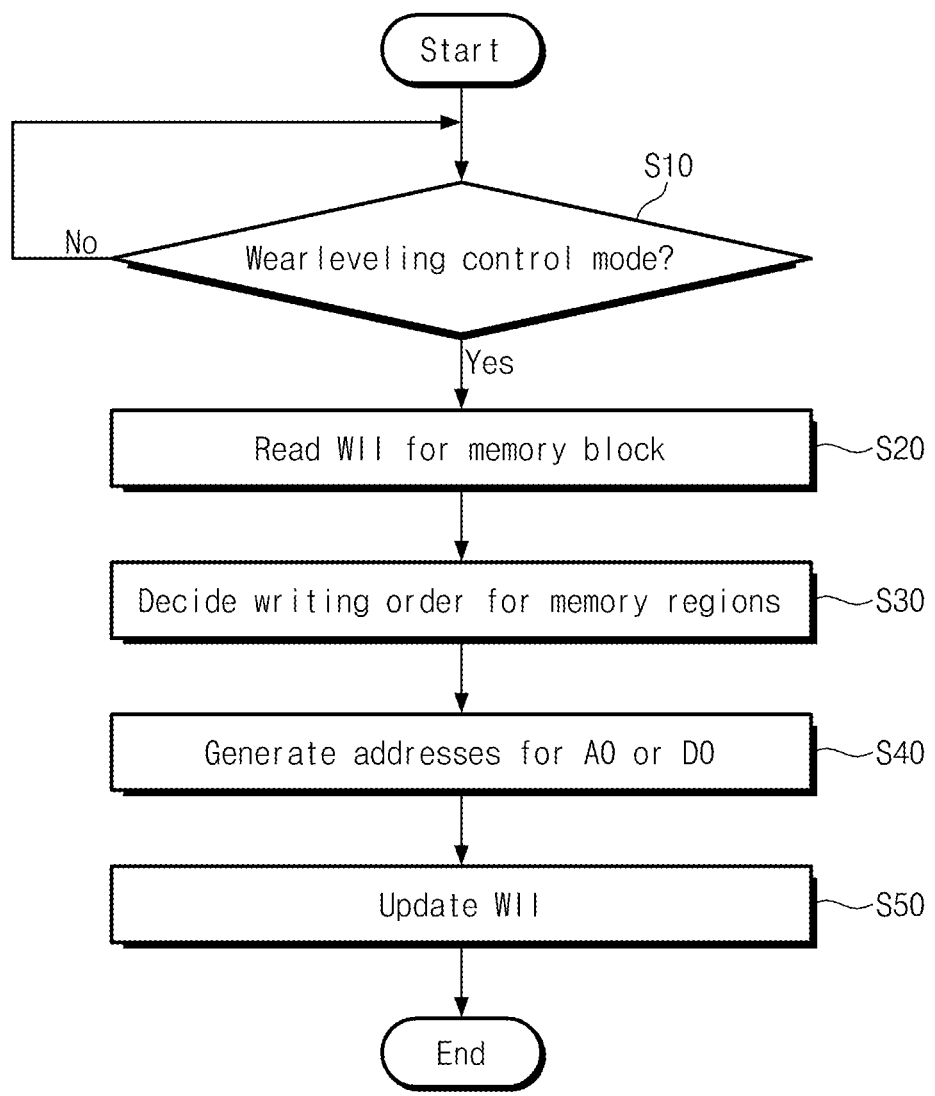
FIG. 14 is a flow chart illustrating a method of controlling a write operation, in accordance with an embodiment of the inventive concept.

FIG. 14 is a flow chart illustrating a method of controlling a write operation, in accordance with an embodiment of the inventive concept.

Referring to FIG. 14, the memory controller 200 determines in step S10 whether there is a wear leveling control mode. The wear leveling control mode may be activated by operation of the writing mode selector 230 in the memory controller 200. For example, when wear leveling is needed or desired, an external signal instructing execution of the wear leveling mode may be applied to the writing mode selector 230. In another case, when an accumulated counting value (e.g., an erase counting value) of the write indication information WII reaches a predetermined value, such as "10000", for example, the writing mode selector 230 may generate an activation signal for executing the wear leveling mode. Execution of the wear leveling mode may likewise be deactivated under certain circumstances, for example, when the wear leveling is set to be executed by default and a deactivation signal is applied from the outside, or when the number of wear leveling executions exceeds a predetermined value.

When it is determined that wear leveling is to be performed, the memory controller 200 reads write indication information WII in step S20 with respect to all the memory blocks or a selected memory block, and stores the read write indication information WII in the WII register 210. In a step S30, according to the write indication information WII stored by memory block unit, the memory controller 200 determines the write order with respect to a memory region (or a word line) or memory regions (or word lines) in the memory block. That is, it is determined whether the write order is an ascending order A0 or a descending order D0.

In step S40, the memory controller 200 generates addresses in an ascending order or a descending order, based on the determination in step S30. In step S50, the memory controller 200 updates the write indication information WII of a corresponding memory block stored in the WII register 210, e.g., if an erase operation of the memory block has been completed, and stores the updated write indication information WII in a corresponding region of the counting value memory 170.

In case of controlling so that data is written in a plurality of memory regions constituting a plurality of memory blocks in the memory cell array, according to the write indication information WII stored by a memory block unit, a write order with respect to the plurality of memory regions in a corresponding memory block is determined When the write indication information WII provides power-on/power-off counting values, the memory controller 200 reads the power-on/power-off count value stored in the nonvolatile memory device 100, e.g., after power up of the system. The memory controller 200 sequentially outputs word line addresses, so that the order of memory regions (one or more word lines) being enabled in a write operation according to the power-on/power-off counting values is in an ascending order or a descending order.

Figure 15:
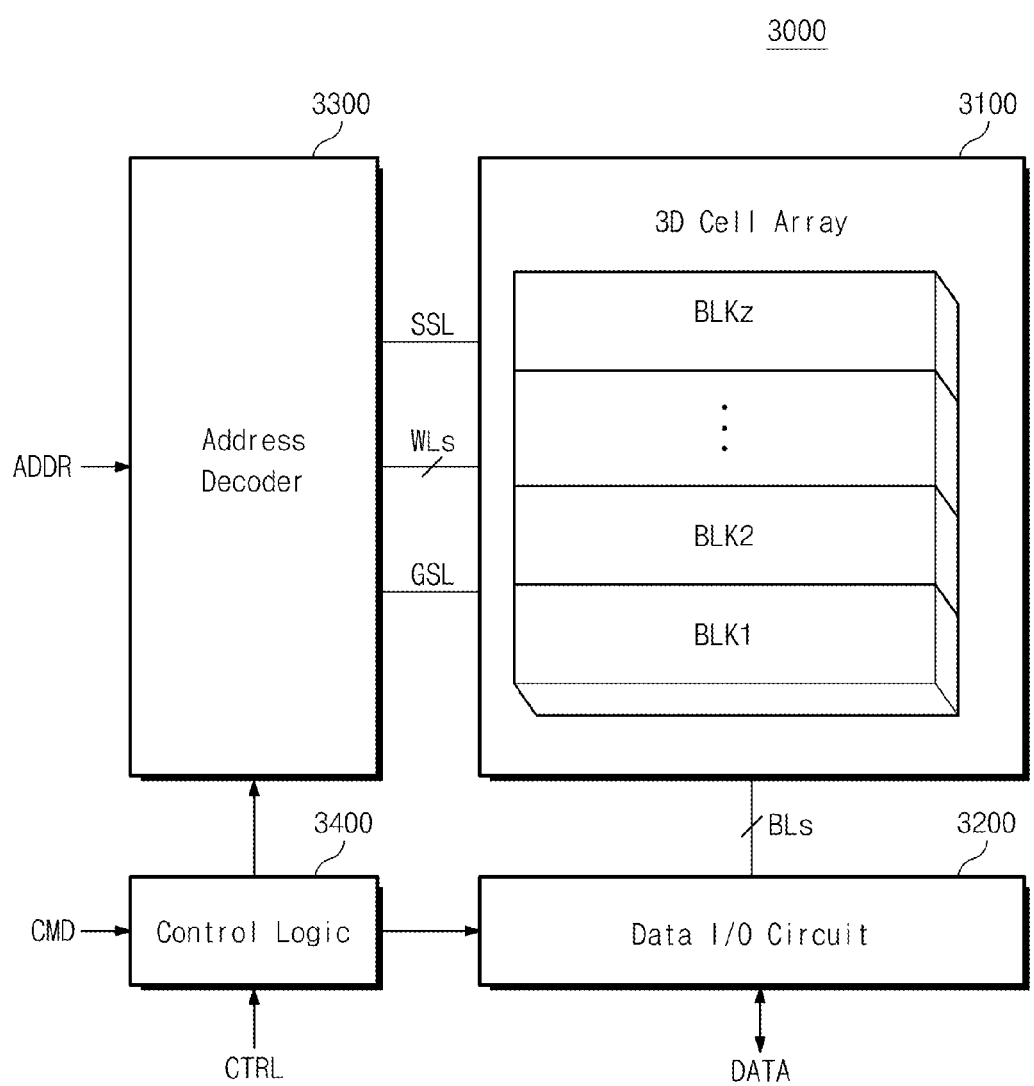
FIG. 15 is a block diagram illustrating flash memory having a three dimensional structure, in accordance with an embodiment of the inventive concept.

FIG. 15 is a block diagram illustrating flash memory having a three dimensional structure, in accordance with an embodiment of the inventive concept. That is, a storage system in accordance with some embodiments may be applied to not only flash memory having a two dimensional structure, but also flash memory having a three dimensional structure.

Referring to FIG. 15, a flash memory 3000 includes a three dimensional cell array 3100, a data input/output circuit 3200, an address decoder 3300 and control logic 3400. The three dimensional cell array 3100 includes multiple memory blocks BLK1~BLKz, each of which has a three dimensional structure. In a memory block having a three dimensional structure (or a vertical structure), memory cells are formed in a direction perpendicular to the substrate. By comparison, in a memory block having a two dimensional structure (or a horizontal structure), memory cells are formed in a horizontal direction with respect to a substrate. Each memory block becomes an erase unit of the flash memory 3000.

The data input/output circuit 3200 is connected to the three dimensional cell array 3100 through multiple bit lines BLs. The data input/output circuit 3200 receives data DATA from the outside to be programmed to the three dimensional cell array 3100 and/or outputs data read from the three dimensional cell array 3100 to the outside. The address decoder 3300 is connected to the three dimensional cell array 3100 through multiple word lines WLs, a ground select line GSL and a string select line SSL. The address decoder 3300 receives addresses ADDR to select corresponding word lines.

The control logic 3400 controls program, read and erase operations of the flash memory 3000. When a program operation is performed, the control logic 3400 controls the address decoder 3300 to provide a program voltage to a select word line and controls the input/output circuit 3200 to program data.

The flash memory in FIG. 15 is a nonvolatile semiconductor memory device. Semiconductor memory devices are classified into volatile semiconductor memory devices and nonvolatile semiconductor memory devices. A volatile semiconductor memory device is able to read and write data at high speed, but loses stored data when its power supply is interrupted, while a nonvolatile semiconductor memory device retains its stored data even when its power supply is interrupted. Thus, a nonvolatile semiconductor memory device is used to store contents that must be preserved, regardless of the status of the power supply. Examples of the nonvolatile semiconductor memory devices include mask read-only memory (MROM), programmable read-only memory (PROM), erasable programmable read-only memory (EPROM), and electrically erasable programmable read-only memory (EEPROM).

Generally, it is not easy for users to renew memory contents of MROMs, PROMs and EPROMs, e.g., since the system itself performs write and erase operations. In contrast, it is possible for users to electrically erase and write EEPROMs, and thus use of EEPROMs for system programming or auxiliary memory devices that require continuous renewal of memory contents is expanding. Also, since flash EEPROMs are highly integrated as compared to conventional EEPROMs, the flash EEPROMs are particularly useful when well applied to high capacity auxiliary memory devices, for example. NAND type flash EEPROMs have the advantage of further high integration, as compared to other types of flash EEPROMs.

Flash memory may be repeatedly programmed and erased, but program and erase cycles of each memory block are limited to a predetermined number of times. When a memory block becomes worn out, considerable performance degradation or loss of usage may result in the corresponding region of the flash memory. In this case, a user of the flash memory may be negatively influenced by loss of data stored in the memory block that is worn out and/or the reduced data storage capacity. The lifetime of a memory block (or a physical location) in a flash memory system is mainly determined by the number of erase cycles. For example, the life time of a flash memory may be about $10^5$ erase operations. Thus, to prolong life of the flash memory, the number of erase operations has to be evenly distributed over the whole area of the flash memory and/or of each memory block (or physical location).

Figure 16:
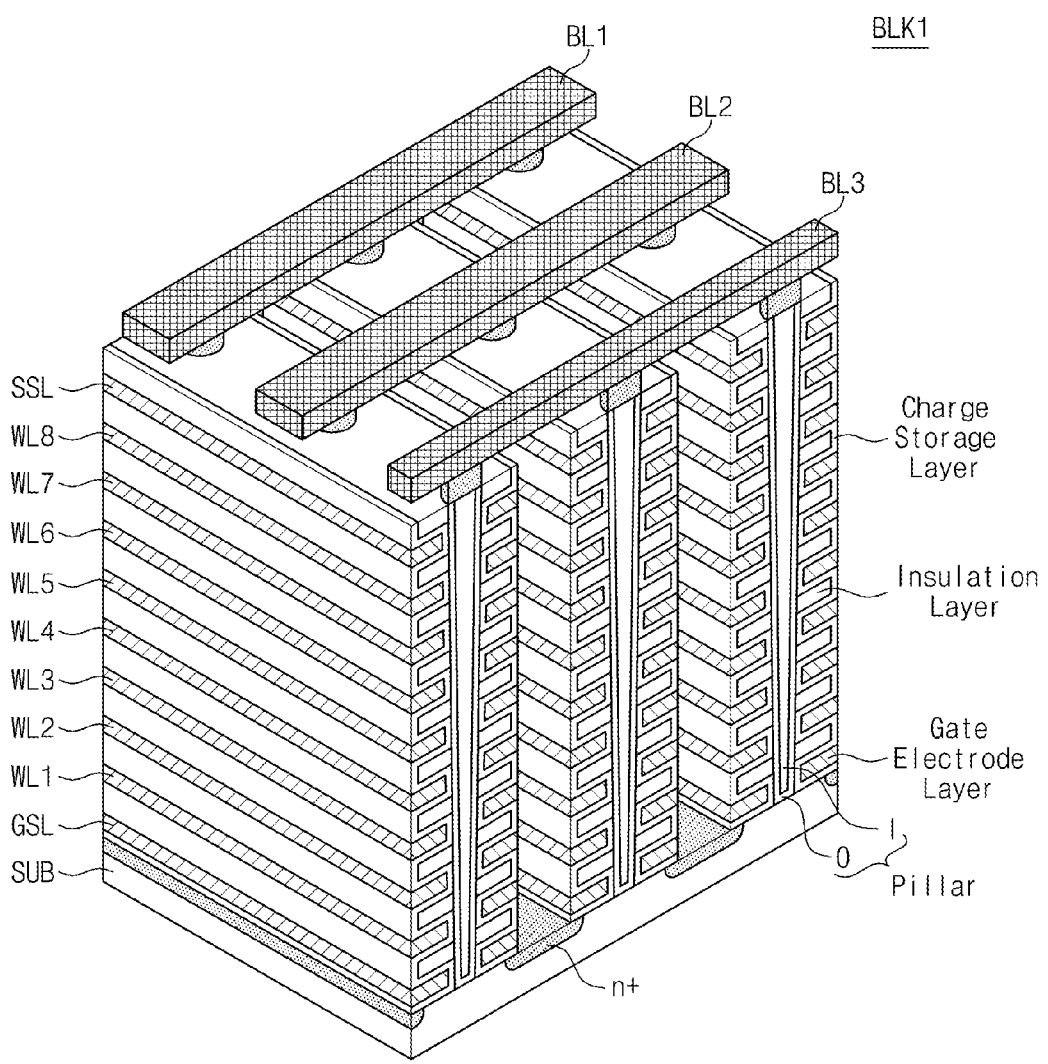
FIG. 16 is a perspective view of a three-dimensional structure of a memory block BLK1 illustrated in FIG. 15, in accordance with an embodiment of the inventive concept.

FIG. 16 is a perspective view of a three-dimensional structure of a memory block BLK1 illustrated in FIG. 15, in accordance with an embodiment of the inventive concept.

Referring to FIG. 16, a memory block BLK1 is formed in direction perpendicular to a substrate SUB. An n$^+$ doping region is formed in the substrate SUB. A gate electrode layer and an insulating layer are alternately deposited on the substrate SUB. A charge storage layer may be formed between the gate electrode layer and the insulating layer.

If vertically patterning the gate electrode layer and the insulating layer, a V-shaped pillar is formed. The pillar penetrates the gate electrode layer and the insulating layer to be connected to the substrate. An external part O of the pillar may be formed by a channel semiconductor and an internal part I may be formed by an insulating material, such as silicon oxide.

Referring to FIG. 16, the gate electrode layer of the memory block BLK1 may be connected to a ground select line GSL, word lines WL1~WL8 and a string select line SSL. The pillar of the memory block BLK1 may be connected to bit lines BL1~BL3. In FIG. 16, the representative memory block BLK1 has two select lines GSL and SSL, eight word lines WL1~WL8 and three bit lines BL1~BL3. However, embodiments of the inventive concept are not limited to this configuration.

Figure 17:
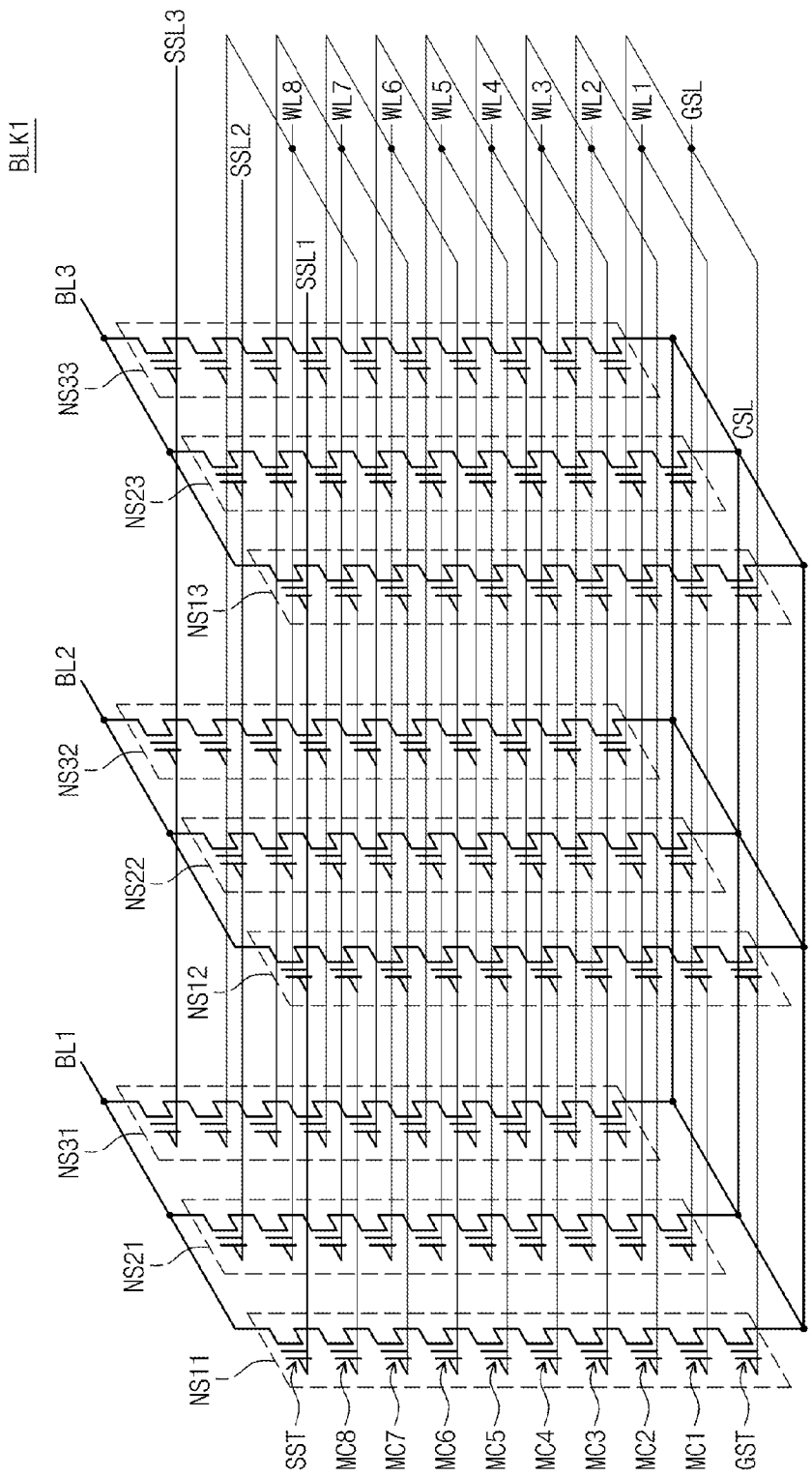
FIG. 17 is an equivalent circuit diagram of the memory block illustrated in FIG. 16, in accordance with an embodiment of the inventive concept.

FIG. 17 is an equivalent circuit diagram of the memory block BLK1 illustrated in FIG. 16, in accordance with an embodiment of the inventive concept.

Referring to FIG. 17, NAND strings NS11~NS33 are connected between the bit lines BL1~BL3 and a common source line CSL. Each NAND string (for example, NS11) includes a string select transistor SST, memory cells MC1~MC8 and a ground select transistor GST. The string select transistor SST is connected to string select lines SSL1—SSL3. The memory cells MC1~MC8 are connected to the word lines WL1~WL8 respectively. The ground select transistor GST is connected to ground select lines GSL1—GSL3. The string select transistor SST is connected to the bit line BL. The ground select transistor GST is connected to the common source line CSL.

Referring to FIG. 17, word lines (for example, WL1) arranged at the same height are connected in common with one another, and the ground select lines GSL1—GSL3 and the string select lines SSL1—SSL3 are separated from one another. In case of programming a memory cell which is connected to the first word line WL1 and belongs to NAND strings NS11, NS12 and NS13 (referred to as a page), the first word line WL1 and first select lines SSL1 and GSL1 are selected.

As described with reference to FIGS. 15 through 17, even in the case that the memory block BLK1 has a three dimensional structure, the memory controller determines a write order for the memory regions in the corresponding memory block to be in an ascending order or a descending order and can control write operations according to the write indication information stored by memory block units.

Figure 18:
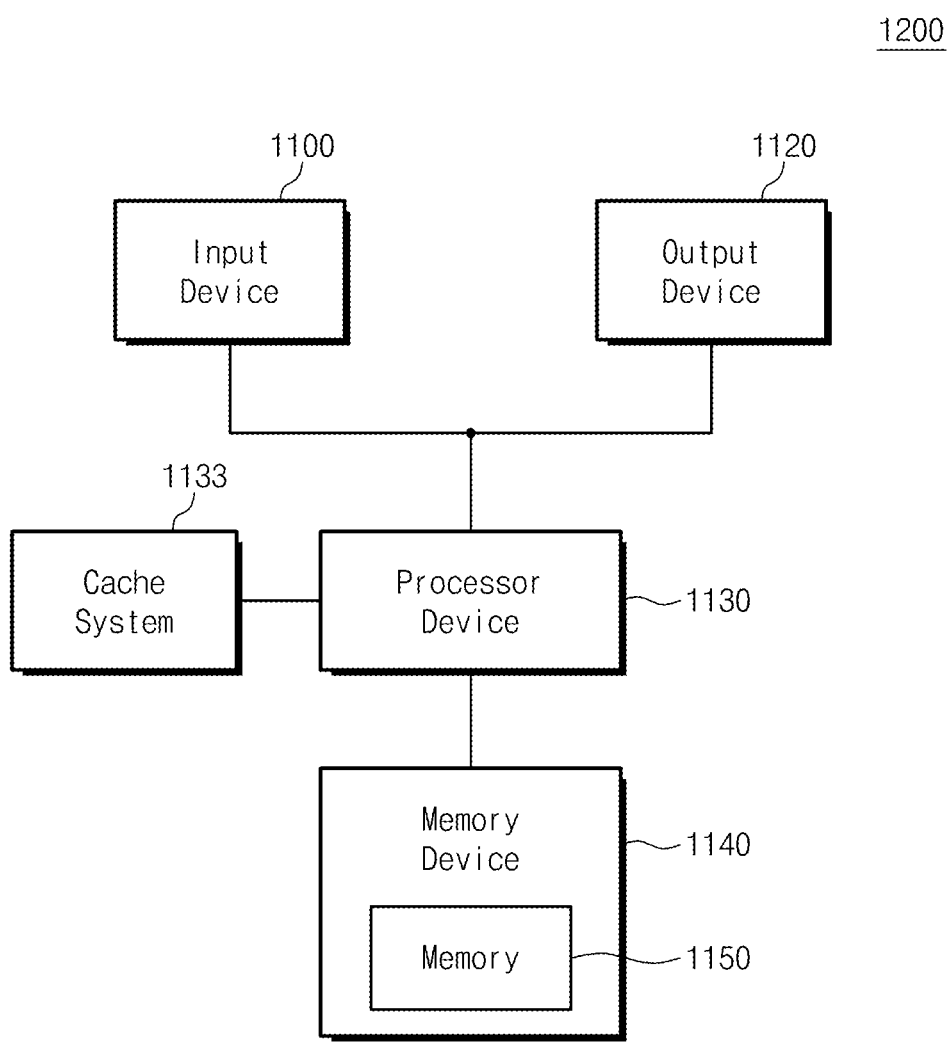
FIG. 18 is a block diagram illustrating an electronic system including a memory system, in accordance with embodiments of the inventive concept.

FIG. 18 is a block diagram illustrating an electronic system including a memory system, in accordance with an embodiment of the inventive concept.

Referring to FIG. 18, an electronic system 1200 includes an input device 1100, an output device 1120, a processor device 1130, a cache system 1133 and a memory device 1140. In FIG. 18, the memory device 1140 may include magnetic memory 1150, such as MRAM. The processor device 1130 controls the input device 1100, the output device 1120 and the memory device 1140 through respective interfaces. In the case of FIG. 18, if connecting the memory device 1140, including the magnetic memory 1150, to the processor device 1130 and controlling a write operation according to write indication information WII stored by memory block unit, wear level deviation is minimized or reduced and thereby reliability and life time of the memory device 1140 is stably guaranteed. Thus, operational performance of the electronic system 1200 including the magnetic memory 1150 is improved.

Figure 19:
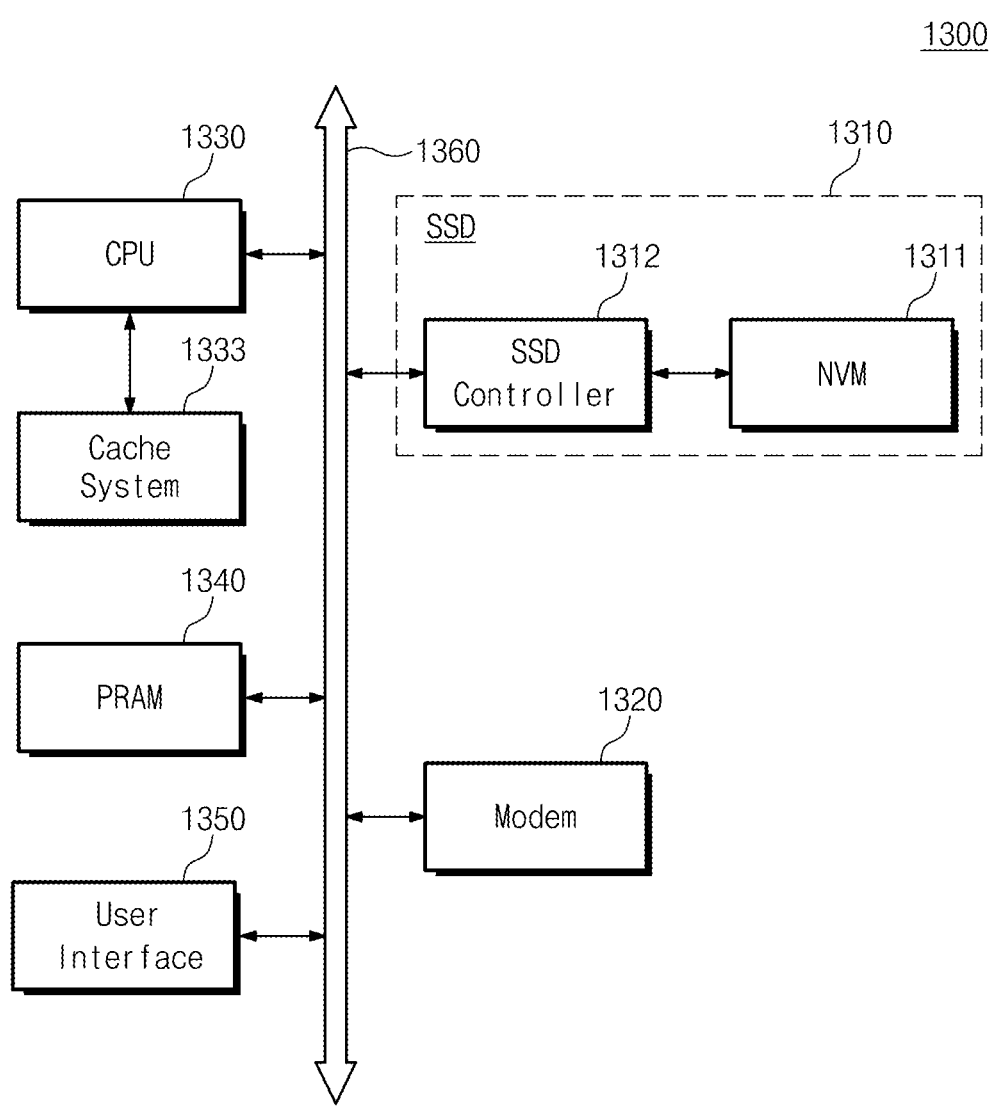
FIG. 19 is a block diagram illustrating a data processing device including a memory system, in accordance with embodiments of the inventive concept.

FIG. 19 is a block diagram illustrating a data processing device including a memory system, in accordance with an embodiment of the inventive concept.

Referring to FIG. 19, a nonvolatile memory 1311 configured in accordance with embodiments of the inventive concept may be included in a data processing device 1300, such as a mobile device or a desk top computer, for example. In FIG. 19, a memory system 1310 may be implemented as a solid state disk (SSD), and may include an SSD controller 1312 and the nonvolatile memory 1311. The SSD controller 1312 controls write operations of data according to write indication information WII stored by memory block unit, thereby minimizing or reducing wear level deviation and improving overall performance of the memory system 1310.

In FIG. 19, the data processing device 1300 includes the memory system 1310 and a modem 1320, a central processing unit (CPU) 1330, a cache system 1333, PRAM 1340 and a user interface 1350 that are connected to one another through a system bus 1360. The memory system 1310 may included with a general memory system, and may include the SSD controller 1312 and the nonvolatile memory 1311. Data processed by the CPU 1330 and data received from the outside may be stored in the memory system 1310. In this case, the data processing device 1300 as an information processing system is able to store a large amount of data in the memory system 1310. Although not illustrated in FIG. 19, the data processing device 1300 may further include an application chipset, a camera image processor and/or an input/output device.

Constituent elements constituting the data processing device 1300 may be embodied through any one of various types of packages. For example, the constituent elements may be packaged by packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

Figure 20:
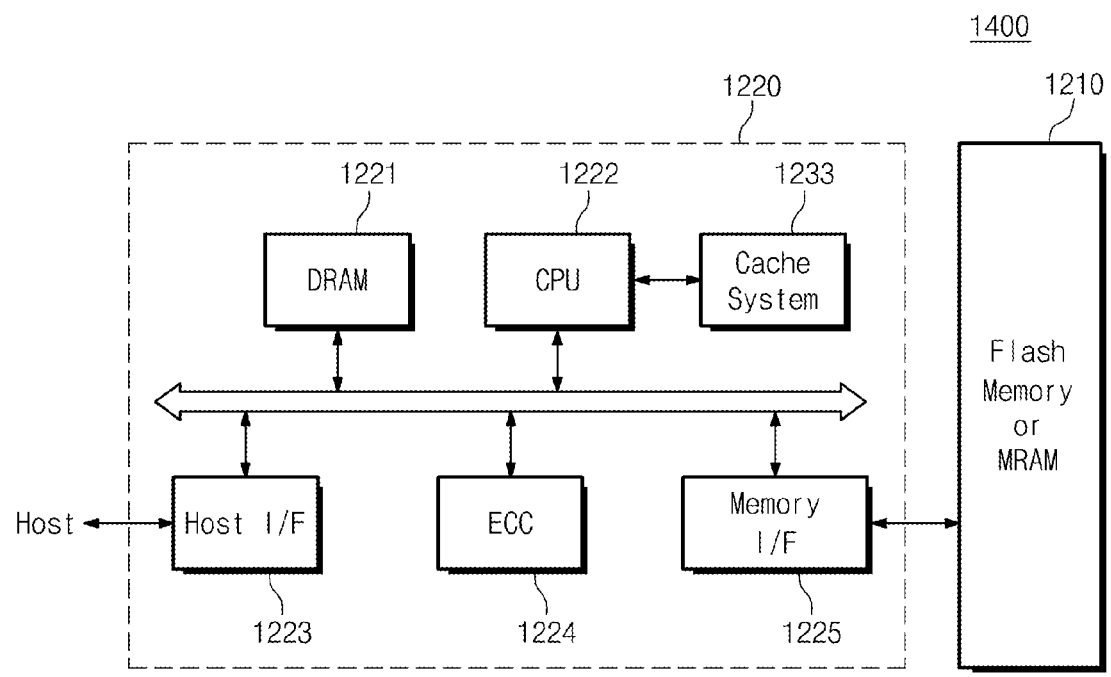
FIG. 20 is a block diagram illustrating a memory card including a memory system, in accordance with embodiments of the inventive concept.

FIG. 20 is a block diagram illustrating a memory card including a memory system, in accordance with an embodiment of the inventive concept.

Referring to FIG. 20, a memory card 1400 providing storage capacity for a large amount of data may connect flash memory or MRAM 1210 in accordance with embodiments of the inventive concept to a memory controller 1220. In FIG. 20, the memory controller 1220 may adopt functions of the memory controller 200 illustrated in FIG. 1, and there is able to control write operations of data according to write indication information WII stored by memory block unit of the flash memory or MRAM 1210. Thus, wear level deviation in the flash memory or MRAM 1210 may be minimized or reduced.

The memory card 1400 includes the memory controller 1220 for controlling data exchanges between a host and the flash memory or MRAM 1210. In the memory controller 1220, DRAM 1221 may be used as working memory for the CPU 1222. A host interface 1223 provides a data exchange interface between the memory card 1400 and the host. An error correction code (ECC) block 1224 detects and corrects errors included in data read from the flash memory and MRAM 1210. A memory interface 1225 provides a data interface between the CPU 1222 and the flash memory or MRAM 1210. The CPU 1222 controls overall operations related to data exchanges with the memory controller 1220. Although not illustrated in FIG. 20, the memory card 1400 may further include ROM (not shown) for storing code for various functions, including an interface with the host and operation of the CPI 1222.

According to embodiments of the inventive concept, wear level deviation among memory regions or word lines may be minimized or reduced. Since the memory regions or word lines are evenly accessed when write operations are performed, life of the nonvolatile memory device increases.

While the inventive concept has been described with reference to illustrative embodiments, it will be apparent to those skilled in the art that various changes and modifications may be made without departing from the spirit and scope of the present inventive concept. Therefore, it should be understood that the above embodiments are not limiting, but illustrative. Thus, to the maximum extent allowed by law, the scope the inventive concept is to be determined by the broadest permissible interpretation of the following claims and their equivalents, and shall not be restricted or limited by the foregoing detailed description.

What is claimed is:

1. A method of controlling a write operation in a nonvolatile memory device to provide wear leveling, the nonvolatile memory device comprising a plurality of memory blocks, the method comprising:
reading write indication information with respect to at least a selected memory block of the plurality of memory blocks;
determining whether a write order of data to be stored in the selected memory block is an ascending order or a descending order, based on the write indication information of the selected memory block; and
generating addresses of memory regions in the selected memory block in an ascending order when the write order of the data is determined to be an ascending order, and generating addresses of the memory regions in the selected memory block in a descending order when the write order is determined to be a descending order, wherein
the write indication information comprises, for each of the plurality of memory blocks, a respective power-on counting value that indicates the number of times the memory block has been powered on.

2. The method of claim 1, wherein the write indication information comprises an erase counting value corresponding to the selected memory block.

3. The method of claim 2, wherein determining whether the write order is an ascending order or a descending order is determined according to the erase counting value.

4. The method of claim 1, wherein the write indication information comprises a power-off counting value corresponding to the selected memory block.

5. The method of claim 1, wherein each of the memory regions comprises at least one word line to which a plurality of memory cells are connected.

6. The method of claim 1, wherein the write indication information is stored by memory block unit.

7. The method of claim 1, further comprising:
sequentially enabling the memory regions one at a time in the ascending order or the descending order for writing the data in the selected memory block.

8. The method of claim 1, further comprising:
sequentially enabling the memory regions two at a time in the ascending order or the descending order for writing the data in the selected memory block.

9. The method of claim 1, wherein each of the plurality of memory blocks comprises a three dimensional structure.

10. A memory controller, comprising:
an address conversion controller configured to convert logical addresses, applied when a write operation is performed on one of a plurality of memory blocks in a nonvolatile memory device, into physical addresses in an ascending order or a descending order according to write indication information of the one memory block; and
an address generator configured to receive the physical addresses and to generate corresponding row select addresses for selecting at least one memory region of a plurality of memory regions in the one memory block, wherein
the write indication information comprises, for each of the plurality of memory blocks, a respective power-on counting value that indicates the number of times the memory block has been powered on.

11. The memory controller of claim 10, further comprising:
a register configured to store the write indication information of the plurality of memory blocks.

12. The memory controller of claim 11, wherein the write indication information of the plurality of memory blocks comprises an erase counting value with respect to each of the memory blocks.

13. The memory controller of claim 12, wherein a beginning address of the physical addresses in the ascending order is a lowest order address and a beginning address of the physical addresses in the descending order is the highest order address.

14. The memory controller of claim 12, wherein a beginning address of the physical addresses in the ascending order is an address of a middle memory region and a beginning address of the physical addresses in the descending order is the address of the middle memory region.

15. The memory controller of claim 11, further comprising:
a writing mode selector connected to the address conversion controller and configured to select a write mode in response to an external command or autonomously.

16. The memory controller of claim 11, wherein the write indication information of the plurality of memory blocks comprises a power-off counting value with respect to each of the memory blocks.

17. The memory controller of claim 10, wherein each of the plurality of memory regions comprises memory cells connected to at least one word line.

18. The memory controller of claim 10, wherein each of the plurality of memory blocks comprises memory cells formed in a direction perpendicular to a substrate.

19. A nonvolatile memory device, comprising:
a memory cell array comprising a plurality of memory blocks, each memory block comprising of a plurality of memory regions;
a counting value memory configured to store write indication information with respect to each memory block; and
control logic configured to perform a write operation according to a write order of data to be stored in a selected memory block of the plurality of memory blocks, the write order being one of an ascending order or a descending order of memory regions in the selected memory block determined based on the stored write indication information with respect to the selected memory block, wherein
the write indication information comprises, for each of the plurality of memory blocks, a respective power-on counting value that indicates the number of times the memory block has been powered on.

20. The nonvolatile memory device of claim 19, wherein the write indication information comprises an erase counting value.

21. The nonvolatile memory device of claim 19, wherein the write indication information comprises power-off counting value.

22. The nonvolatile memory device of claim 19, wherein each of the memory blocks comprises memory cells formed in a direction perpendicular to a substrate.

* * * * *